May 25, 1926.

H. WEINBERG 1,585,807

MACHINE OR APPARATUS FOR USE IN SUPPORTING ANIMALS WHILE BEING SLAUGHTERED

Filed May 29, 1924  2 Sheets-Sheet 1

Inventor
Harris Weinberg
Attorneys

May 25, 1926.
H. WEINBERG
1,585,807.
MACHINE OR APPARATUS FOR USE IN SUPPORTING ANIMALS WHILE BEING SLAUGHTERED
Filed May 29, 1924  2 Sheets-Sheet 2
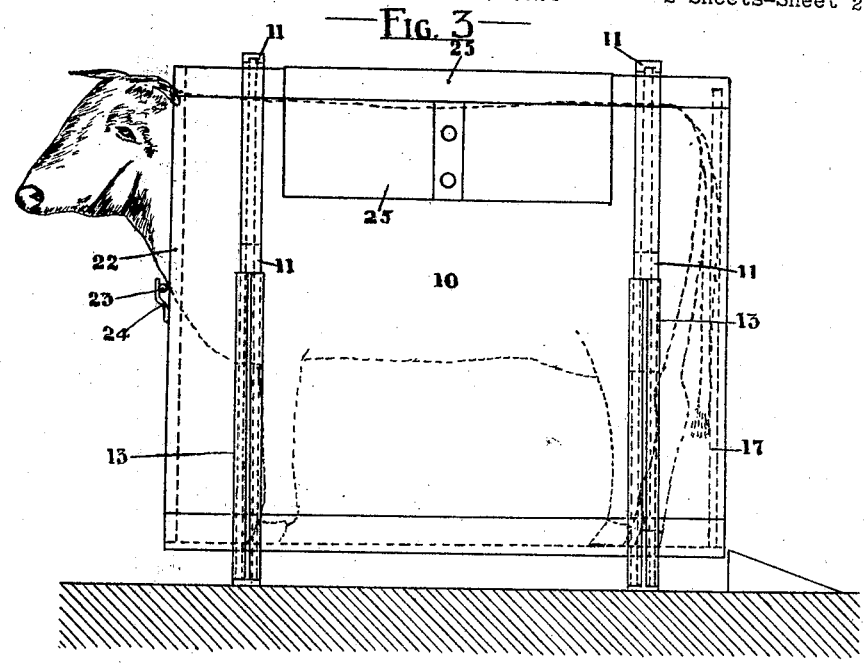
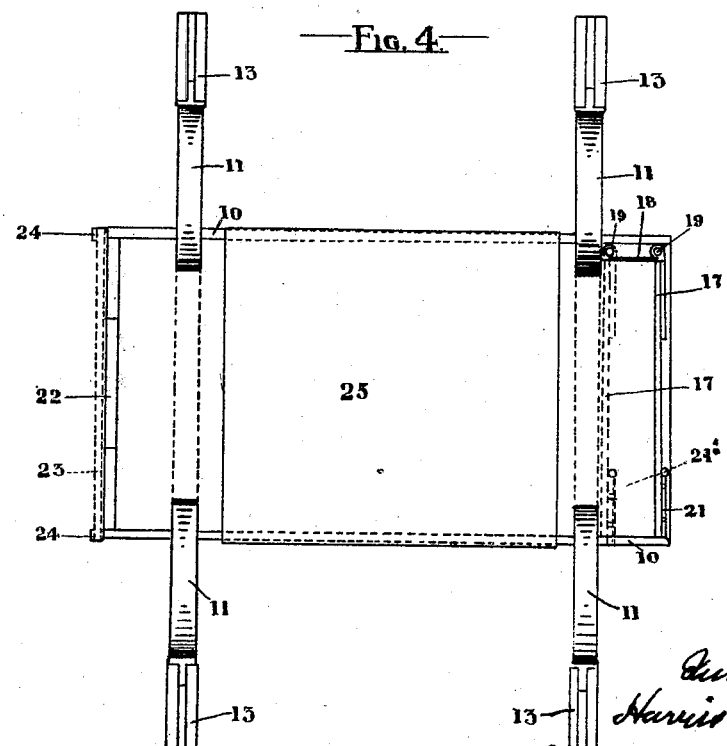

Patented May 25, 1926.

1,585,807

UNITED STATES PATENT OFFICE.

HARRIS WEINBERG, OF LEEDS, ENGLAND.

MACHINE OR APPARATUS FOR USE IN SUPPORTING ANIMALS WHILE BEING SLAUGHTERED.

Application filed May 29, 1924. Serial No. 716,798.

This invention relates to machines or apparatus for use in supporting animals whilst being slaughtered the chief object being to provide a machine or apparatus which will enable the animals to be humanely dealt with prior to slaughter. Hitherto, heavy animals such as cattle have been thrown or cast on to their backs in such a way as to cause unnecessary pain and suffering.

According to the present invention the machine or apparatus comprises a pivoted support or carrier adapted to permit of the animal walking into and being enclosed in said carrier which can be then turned so as to bring the animal into the required position for slaughtering without unnecessary premature suffering. For this purpose said support or carrier may consist of a rectangular or trough-shaped receptacle with sides between which the animal may walk to take up a position with its head passed through an opening at the forward end. The rear end, preferably hinged, may then be closed up behind the animal and a strong leather or other appropriate sheet, fastened to one side, passed over the back or top of the animal to be secured to the opposite side.

In order that the invention may be clearly understood and readily carried into effect the same will now be more fully described with reference to the accompanying drawings in which:—

Figure 3 is a side view of the apparatus with an animal in the carrier prior to being turned or swung into position for slaughtering.

Figure 4 is a plan of the machine or apparatus shown in Figure 3.

Figure 1:
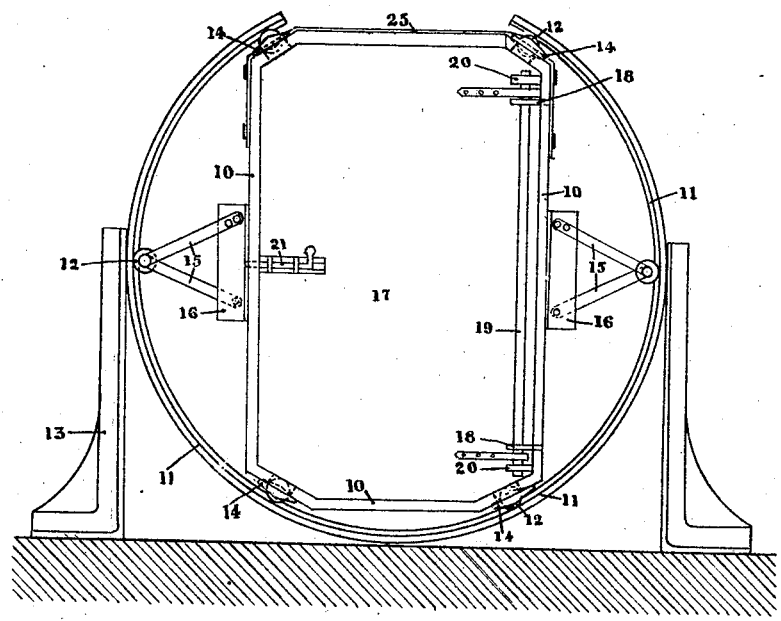
Figure 1 is a view of the rear end or entrance of the machine or apparatus.
Figure 2:
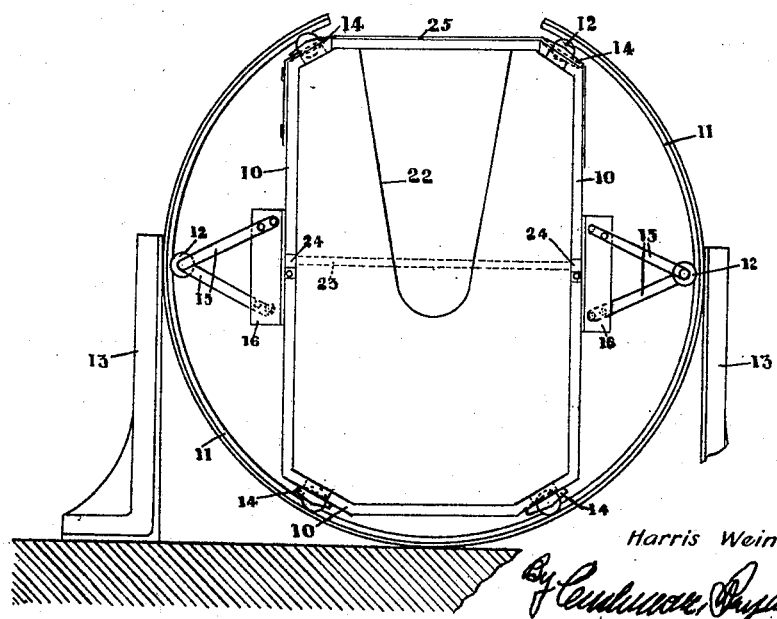
Figure 2 is a view of the forward or opposite end.

Referring to the drawings the machine or apparatus as shown comprises a carrier 10 of rectangular formation capable of being automatically turned over or swung within a frame like structure 11. For this purpose the carrier 10 is provided with runners or the like 12 adapted to engage circular rails constituting the frame like structure 11, which as shown may be supported by vertical brackets 13. The runners 12 at the upper and lower corners of the carrier 10 are mounted in brackets 14 whilst the intermediate runners 12 are supported at the extremities of arms 15 secured to the sides of the carrier 10 by angle members 16. The rear end of the carrier 10 is in the form of a hinged door 17 for closing up behind the animal and which is capable of being adjusted or moved within the carrier 10 in guides 18 to suit the varying lengths or size of the animal entering the carrier see Figure 4. Thus, the door may be hinged to vertical rods 19 having associated therewith wheels or runners 20 engaging the sides of the carrier, whilst the securing of the door in position may be effected by bolts or bars 21. The front end of the carrier 10 is cut away or formed with an opening 22 to allow the animal's head and neck to pass therethrough, and if desired a bar or the like 23 supported by brackets or lugs 24 may be placed across the opening when the animal has entered the carrier. The support or carrier 10 when closed may be turned over to enable the carrier 10 to be brought to a position whereby the animal lies either on its back or side for slaughtering. After slaughtering, the flexible sheet or its equivalent 25 and the animal is removed to allow the carrier to be returned to its normal position. A suitable gangway (not shown) may be provided to enable the animal to enter the carrier when in its normal position.

I claim:—

1. In a device of the class described, the combination of a plurality of fixed substantially circular tracks, a box-like animal receiving carrier revolubly mounted on said tracks, a head receiving opening in one end of said carrier, and a hinged door to close the other end of said carrier and hold the animal therein.

2. In a device of the class described, the combination of a plurality of fixed substantially circular tracks, an animal receiving carrier revolubly mounted on said tracks, said carrier being a rectangular or box-like receptacle having a head opening in one end and an open top, a hinged door at the other end to hold the animal therein, and a closure for the open top of said receptacle.

3. A machine or apparatus for use in supporting animals whilst being slaughtered, comprising in combination fixed circular rails constituting the frame-like structure, a rectangular receptacle constituting the carrier, runners mounted in brackets on the carrier for engaging the fixed circular rails, runners mounted on arms secured to the sides of the carrier and engaging the circular rails, a hinged door at the rear end of said carrier for closing up behind the animal, means for adjusting the position of the hinged door to suit the varying lengths or size of animal, means for securing the hinged door in the adjusted position, and an opening in the front end of the carrier to allow the animal's head and neck to pass therethrough.

HARRIS WEINBERG.